United States Patent [19]

Henderson et al.

[11] Patent Number: 4,540,560

[45] Date of Patent: Sep. 10, 1985

[54] CARBON BLACKS

[75] Inventors: E. Webb Henderson; Mark L. Gravley, both of Bartlesville, Okla.

[73] Assignee: Phillips Petroleum Company, Bartlesville, Okla.

[21] Appl. No.: 543,684

[22] Filed: Oct. 20, 1983

Related U.S. Application Data

[62] Division of Ser. No. 413,202, Aug. 30, 1982.

[51] Int. Cl.$^3$ .................. C01B 31/00; C01B 31/02; C04B 31/02
[52] U.S. Cl. ................... 423/445; 423/449; 423/450; 106/307
[58] Field of Search .............. 423/445, 449, 450, 455, 423/456; 106/307

[56] References Cited

U.S. PATENT DOCUMENTS

| | | | |
|---|---|---|---|
| Re. 28,974 | 9/1976 | Morgan et al. | 423/450 |
| 2,375,795 | 5/1945 | Krejci | 23/209.8 |
| 2,564,736 | 8/1951 | Stokes | 22/209.8 |
| 2,616,794 | 11/1952 | Krejci | 23/209.6 |
| 2,616,795 | 11/1952 | Krejci | 23/209.8 |
| 2,682,245 | 6/1954 | Pinch | 114/16.5 |
| 2,682,450 | 6/1954 | Sweigart et al. | 23/259.5 |
| 2,779,664 | 1/1957 | Sweitzer | 23/209.4 |
| 2,781,247 | 2/1957 | Krejci | 23/209.4 |
| 2,782,101 | 2/1957 | Heller | 23/209.4 |
| 2,851,333 | 9/1958 | Brown et al. | 23/14.5 |
| 2,851,337 | 9/1958 | Heller | 23/209.4 |
| 2,934,410 | 4/1960 | Smith | 23/277 |
| 3,010,795 | 11/1961 | Friauf et al. | 23/209.4 |
| 3,046,096 | 7/1962 | Heller et al. | 23/209.4 |
| 3,077,761 | 2/1963 | Morgan | 73/4 |
| 3,114,691 | 12/1963 | Case | 204/171 |
| 3,318,664 | 5/1967 | Latham, Jr. et al. | 23/209.4 |
| 3,375,075 | 3/1968 | Ruble | 23/209.4 |
| 3,490,869 | 1/1970 | Heller | 23/209.4 |
| 3,498,753 | 3/1970 | Hokari et al. | 23/277 |
| 3,514,264 | 5/1970 | Sennewald | 23/284 |
| 3,560,164 | 2/1971 | Venable | 23/259.5 |
| 3,565,586 | 2/1971 | Kiyonaga | 23/259.5 |
| 3,595,618 | 7/1971 | Kiyonaga et al. | 23/209.4 |
| 3,615,210 | 10/1971 | Jordan et al. | 23/209.4 |
| 3,615,211 | 10/1971 | Lewis | 23/209.4 |
| 3,701,827 | 10/1972 | Dahmen | 423/456 |
| 3,725,103 | 4/1973 | Jordan et al. | 423/445 |
| 3,787,562 | 1/1974 | Heller et al. | 423/445 |
| 3,799,745 | 3/1974 | Cheng | 23/259.5 |
| 3,799,788 | 3/1974 | Jordan et al. | 106/307 |
| 3,922,335 | 11/1975 | Jordan et al. | 423/450 |
| 3,952,087 | 4/1976 | Antonsen et al. | 423/450 |
| 4,018,878 | 4/1977 | Reynolds | 423/450 |
| 4,065,265 | 12/1977 | Chesnutt | 23/259.5 |
| 4,077,761 | 3/1978 | Dollinger et al. | 431/8 |
| 4,093,421 | 7/1978 | Jerkins | 23/259.5 |
| 4,105,750 | 8/1978 | Horn et al. | 423/455 |
| 4,106,912 | 8/1978 | Dollinger et al. | 23/259.5 |
| 4,179,494 | 12/1979 | Rothbühr et al. | 423/456 |
| 4,267,160 | 9/1979 | Kraus et al. | 423/456 |
| 4,339,422 | 7/1982 | Cheng | 423/456 |
| 4,341,750 | 7/1982 | Vanderveen | 423/450 |
| 4,360,627 | 11/1982 | Okado et al. | 106/307 X |
| 4,370,308 | 1/1983 | Williams | 423/450 |
| 4,391,789 | 7/1983 | Estopinal | 423/450 |
| 4,393,034 | 7/1983 | Smith | 423/450 |
| 4,398,582 | 8/1983 | Yuto et al. | 152/209 |
| 4,477,621 | 10/1984 | Sato et al. | 524/496 |

FOREIGN PATENT DOCUMENTS

| | | |
|---|---|---|
| 70-1804 | 10/1970 | South Africa . |
| 71-1180 | 10/1971 | South Africa . |
| 71-2033 | 12/1971 | South Africa . |
| 71-7513 | 6/1972 | South Africa . |
| 1359216 | 7/1974 | United Kingdom . |

OTHER PUBLICATIONS

Janzen, "The Refractive Index of Colloidal Carbon", Journal of Colloid and Interface Science, vol. 69, No. 3, May 1979.

Janzen, "Spectrophotometric Determination of Volume Distributions for Carbon Blacks", Applied Optics, vol. 17, No. 19, Sept. 1, 1980.

*Primary Examiner*—Gregory A. Heller
*Attorney, Agent, or Firm*—John R. Casperson

[57] ABSTRACT

A new reactor for the production of carbon black, a new method for the production of carbon black, and a new carbon black are disclosed. The carbon blacks are characterized by a surface area preferably in the range of 70 to 150 m$^2$/g and "G" values of either less than 1.20 or greater than 1.85, corresponding to very narrow or very broad aggregate size distributions, respectively. The reactor is preferably for axial flow of combustion gases and is characterized by serial arrangement of a cylindrical combustion zone, a frustoconical converging zone, a throat, an abrupt diverging zone and a cylindrical pyrolysis zone. In certain aspects of the invention, the combustion gases are formed by combusting low BTU fuel and forcing these gases through the throat at a velocity approaching Mach 1. In one method of carbon black production, the feedstock is introduced into the converging zone. In another method, it is introduced as a spray. In other methods, the feedstock is introduced with upstream or downstream velocity components.

2 Claims, 1 Drawing Figure

CARBON BLACKS

This application is a division of copending application, Ser. No. 413,202, filed Aug. 30, 1982.

In one aspect, the invention relates to new carbon black reactors. In another aspect, the invention relates to new methods for producing carbon black. In yet another aspect, the invention relates to novel furnace-type carbon black products.

Although commercial vortex flow reactors are adequate for today's needs, changes to provide greater economy and flexibility of operation and even higher quality product could be desirable.

For example, improvements in the efficiency at which carbon black is produced from the feedstock would be very desirable. Also, the production of a carbon black product which contains exceptionally low levels of "grit" would be very desirable. The capability of producing carbon blacks having extremely positive or extremely negative tint residuals would also be desirable.

In accordance with the invention, the above objectives are satisfied.

In one aspect, the present invention provides a composition of matter comprising a carbon black characterized by a CTAB surface area of between about 50 and 500 $m^2/g$ and an aggregate size distribution breadth index G of 1.85 or greater. This type of carbon black imparts low hysteresis properties to rubber into which it has been compounded and can therefore be very desirable for the production of belts and tires, for example.

In another aspect, the present invention provides a composition comprising a carbon black characterized by a CTAB surface area of between about 50 and 500 $m^2/g$ and an aggregate size distribution breadth index G of 1.20 or less. This type of carbon black has a high positive tint residual value which imparts high abrasion resistance in tires.

In still another aspect of the present invention there is provided a carbon black reactor formed by refractory which defines a reaction flow path comprising in series from an upstream end and in generally axial alignment (a) a generally cylindrical combustion zone characterized by a generally annular upstream end wall defining a passage generally axially directed into the generally cylindrical combustion zone; (b) a generally frustoconical mixing zone characterized by a sidewall converging from the sidewall of the generally cylindrical combustion zone, said sidewall having ports therethrough for the receipt of feedstock injectors; and (c) a generally cylindrical pyrolysis zone defined by a generally cylindrical sidewall connected to the downstream end of the mixing zone by a generally annular end wall. This reactor is well-adapted for producing carbon black at high yields and low grit levels.

In yet another aspect of the present invention, there is provided for a process of producing carbon black comprising flowing a stream of hot combustion gases having a temperature sufficiently high to decompose a carbonaceous feedstock and form carbon black sequentially through a converging zone, a throat and an abruptly diverging zone and introducing the carbonaceous feedstock transversely into the stream of hot combustion gases from the periphery of the stream for decomposition to form the carbon black, the improvement comprising introducing the carbonaceous feedstock as a coherent stream into the converging zone. The improvement step results in greater yields of product which has a higher tint residual.

In another aspect of the present invention there is provided for a process of producing carbon black comprising flowing a stream of hot combustion gases having a temperature sufficiently high to decompose a carbonaceous feedstock and form carbon black sequentially through a converging zone, a throat and an abruptly divering zone and introducing the carbonaceous feedstock transversely into the stream of hot combustion gases from the periphery of the stream for decomposition to form the carbon black, the improvement comprising introducing the carbonaceous feedstock into the throat within a distance of about 4 inches from the abruptly diverging zone. The improvement step results in the production of low or negative tint residual black which imparts low hysteresis to rubber into which it has been compounded.

In another aspect of the present invention there is provided for a process of producing carbon black comprising flowing a stream of hot combustion gases having a temperature sufficiently high to decompose a carbonaceous feedstock and form carbon black sequentially through a converging zone, a throat and an abruptly diverging zone and introducing the carbonaceous feedstock transversely into the stream of hot combustion gases from the periphery of the stream for decomposition to form the carbon black, the improvement comprising introducing the carbonaceous feedstock into the stream of hot combustion gases as a coherent stream having a velocity component counter to the flow of the stream of hot combustion gases.

In still another aspect of the present invention there is provided for a process of producing carbon black comprising flowing a stream of hot combustion gases having a temperature sufficiently high to decompose a carbonaceous feedstock and form carbon black sequentially through a converging zone, a throat and an abruptly diverging zone and introducing the carbonaceous feedstock transversely into the stream of hot combustion gases from the periphery of the stream for decomposition to form the carbon black, the improvement comprising introducing the carbonaceous feedstock as a spray into at least one of the converging zone and the throat. The improvement step results in the production of carbon black at higher efficiency than where coherent streams of feedstock are utilized.

BRIEF DESCRIPTION OF THE DRAWING

The FIGURE illustrates certain features of one embodiment of the present invention.

DETAILED DESCRIPTION OF THE INVENTION

Figure 1:
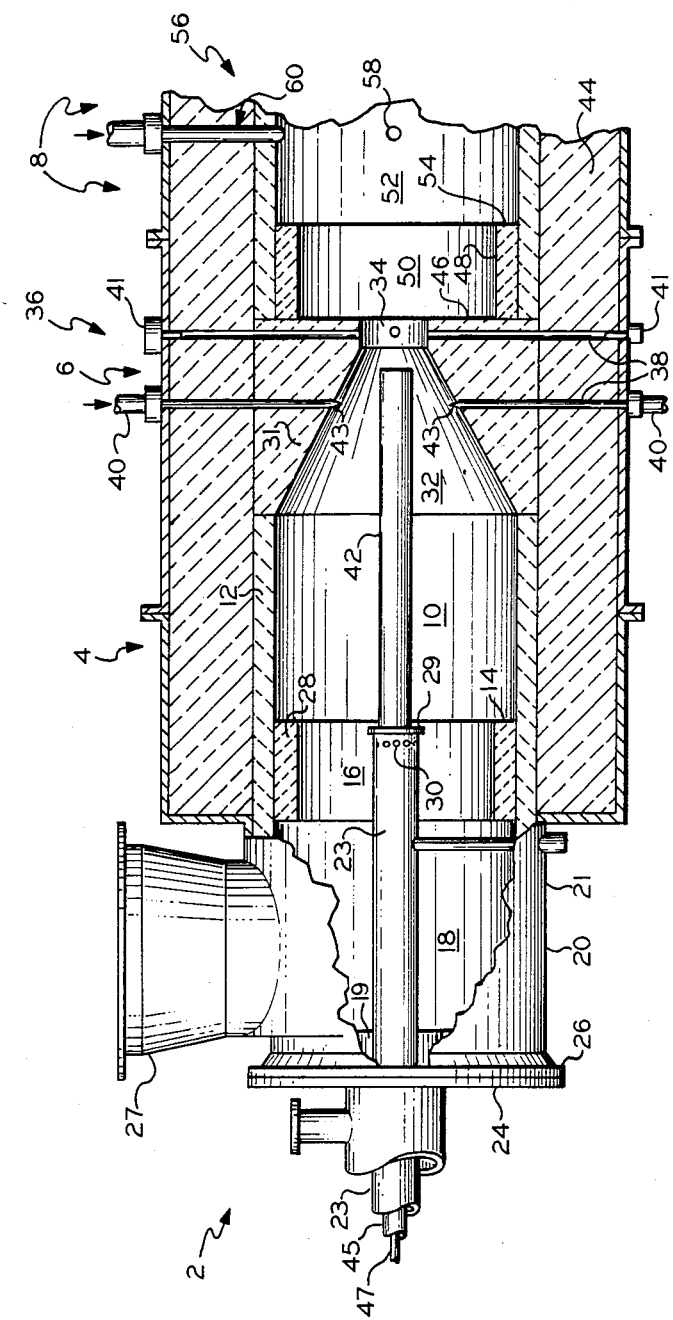

According to the invention, an apparatus 2 comprises, serially arranged, a combustion zone 4, a mixing zone 6, and a pyrolysis zone 8.

Preferably, the combustion zone 4 comprises a combustion chamber 10 defined by a preferably generally cylindrical sidewall 12 and a generally annular upstream end wall 14 having a passage 16 therethrough generally axially directed into the generally cylindrical combustion chamber 10. The sidewall 12 and endwall 14 are generally formed from a refractory material to resist high temperatures.

Oxidant fluid and combustible fluid are introduced into the chamber 10 via the passage 16. Preferably, the passage 16 leads from chamber 18 which is defined by a housing 20. The housing 20 can be formed from metal, such as steel, and preferably comprises a generally tubular sidewall 21 so that the chamber 18 is generally cylindrical as it extends from the passage 16, preferably in axial alignment therewith. A tubular member 23 extends through the chamber 18 axially and empties into the passage 16. In the preferred embodiment, the tubular member 23 carries the combustible fluid which is mixed with oxidant fluid from the chamber 18 in the passage 16. The housing 20 is closed at its upstream end by a plate 24 affixed to a flange 26 which circumscribes the upstream end of the housing 20. The tubular member 23 enters the chamber 18 in an axial direction through the plate 24. An annulus 19 defined between the plate 24 and the tubular member 23 provides a passage for the introduction of coolant, such as a cool gas, into the chamber 18 to protect the metal components in the neighborhood of flange 24 from high temperatures. A duct 27 opens into the chamber 18 through the sidewall 21. The duct 27 can open into the chamber 18 tangentially if desired, although a duct opening into the chamber 18 generally normally with respect to the longitudinal axis of the chamber 18 has been used with good results.

Preferably, the generally annular surface 14 is a part of a ring or choke 28 positioned between the chambers 18 and 10 and defining the passage 16, because the ring helps to distribute oxidant fluid from the chamber 18 into the chamber 10. The ring 28 can be formed from a section of tubular refractory. The tubular member 23 preferably empties into the passage 16 through a plurality of radially outwardly directed ports or orifices 30 passing through the sidewall of the tubular member 23 where a gaseous combustible fluid is utilized, for ease of fabrication and reliability of operation. A bluff body, preferably a generally annular flange 29 is attached to the tubular member 23 slightly downstream of the ports 30 to aid in maintaining stable combustion. Preferably, the flange 29 is positioned upstream of the surface 14, most preferably about 2 inches into the zone 16, as measured from zone 18.

Generally, the reaction flow passage expands between the passage 16 and the zone 10 from a first diameter to a second diameter such that the ratio between the first diameter and the second diameter is between about 0.3 and about 0.8. Usually, the ratio of the diameters of the flange 29 and the passage 16 is within the range of from about 0.5 to about 0.75.

The mixing zone 6 comprises a sidewall 31 formed from refractory defining a chamber 32 in axial alignment with and converging from the combustion chamber 10 to a throat 34 and a means 36 for introducing a carbonaceous feedstock through the sidewall 31 and into at least one of the converging chamber 32 and the throat 34. Preferably, the converging chamber 32 converges from an inlet having a diameter about the same as that of the combustion chamber 10 to an outlet having a diameter about the same as that of the throat 34. A converging chamber which converges at a half-angle of about 18°30′ has been used with good results. The means 36 comprises one or more sets of ports 38, which open into the chamber 32, more preferably, 2 or more sets of ports 38 with at least one set opening into the converging chamber 32 and at least one set opening into the throat 34 for the positioning of carbonaceous feedstock injectors 40. Usually, the ports of a set will be circumferentially spaced about the reaction flow passage at a selected position with respect to the longitudinal axis of the reaction flow passage, with the ports being preferably equiangularly spaced from each other for uniform distribution of feedstock from the injectors 40 and into the reaction flow passage. Generally, each set of ports 38 will be arranged in equiangular spacing, for example, 180°, 120°, 90°, or 60°, and be radially inwardly directed, although they can be canted upstream or downstream as desired. Ports not in use can be sealed with plugs 41. Usually, the injectors 40 will be positioned through only one set of the ports 38 so that they empty into the flow passage of the reactor at the same longitudinal position. As injectors are moved upstream, the structure of the black increases. Preferably, the tip of each injector is positioned about flush with the reactor wall, to lessen heat exposure and cut down on coking and plugging.

Alternatively, the injectors 40 can be provided with nozzles 43 which can be canted to introduce carbonaceous feedstock into the reaction flow passage with an upstream or downstream velocity component as desired. The nozzles 43 can be selected to introduce the feedstock as a coherent stream or a spray or any other pattern as desired. When the feedstock is introduced into the reactor in a partially upstream or downstream direction, preferably upstream with a component counter current to the flow of combustion gases to improve mixing it is preferred that the nozzles be selected to emit a coherent stream of feedstock, so that the dissociation of the feedstock will take place away from the reactor wall and the penetration of the feedstock will be sufficient to cause good distribution of dissociated carbonaceous material across the reaction flow path. Where the feedstock is to be introduced generally normally into the reactor with respect to its axis, it is currently preferred to utilize nozzles which are designed to emit a spray, although spray nozzles are also advantageous where the nozzles are canted, especially when the nozzles are canted to emit feedstock in a downstream direction. It appears that when spray-stream nozzles are used, product yield from the reactor is enhanced over when solid-stream nozzles are used. Solid-cone type spray nozzles, which emit atomized feedstock at an angle of divergence of about 15° have been used with good results. Jacket cooling air, not shown, can surround the oil injectors 40, flowing through the annulus between the oil tube and the wall of the port.

When the apparatus is operated with carbonaceous feedstock injection into the throat 34, carbon black having a wide aggregate size distribution can be produced. Generally, for this type of operation, the feedstock injectors will be positioned about 0–4 inches, for example between 1 and 3 inches, upstream of the pyrolysis zone. Such a carbon black is frequently characterized by a negative tint residual and will impart low hystersis to rubber into which it has been compounded. When the apparatus is operated with feedstock injection into the converging chamber 32, carbon black having a very narrow aggregate size distribution can be produced. Such a carbon black is frequently characterized by a high or positive tint residual. Generally, for this type of operation, the feedstock or oil injectors 40 will be positioned between about 4 inches and about 36 inches upstream of the pyrolysis zone, usually between about 6 and about 24 inches upstream.

If desired, carbonaceous feedstock can also be injected into the converging chamber 32 and/or throat 34 via optional axial feedstock injector assembly 42, which can be fitted with an appropriate nozzle to dispense liquid or vaporous, preferably liquid, carbonaceous feedstock. In some operations, tube 42 is not installed, however, in the preferred embodiment of this aspect of the invention, the assembly 42, which preferably comprises a feedstock tube 47 coaxially disposed within a water-jacket tube 45, enters the reactor 2 coaxially within the gas tube 23 and extends adjustably from the end of the tube 23 at least into the converging chamber 32. The feedstock tube 47 can be fitted with any one of a variety of feedstock nozzles, for example, single or multiple solid jet nozzles with the jets directed axially, radially outwardly, or at an angle, or a solid or a hollow cone nozzle, etc., as desired.

The pyrolysis zone 8 preferably is comprised of one or more generally cylindrical sections of refractory material 44. The mixing zone 6 is preferably a separate section of refractory, so that it can be easily replaced if desired.

Because of very high temperatures in zone 8, heavy-duty refractory, such as chrome-alumina refractory (minimum 9 wt. % $Cr_2O_3$) manufactured by Didier-Taylor, Cincinnati, Ohio, is preferably employed for at least the construction of the zone 8.

It is desired to generate high turbulence in the reaction mixture when it passes from the mixing zone 6 to the pyrolysis zone 8, to disintegrate the carbonaceous feedstock to form high quality carbon black. It is therefore very important that the reaction flow passage undergo an abrupt expansion as it enters the pyrolysis zone from the mixing zone. Preferably, the half-angle of expansion is near 90°, because this configuration has been used with good results.

Preferably, the upstream end of the pyrolysis zone is defined by a generally annularly shaped end wall 46 which extends from the downstream end of the throat 34 to the upstream end of pyrolysis zone sidewall 48. The pyrolysis zone preferably has a generally circular cross-section in a plane normal to the axis of the reaction flow passage. The desired amount of expansion between the zones will depend on reactor flow conditions and the desired properties of the carbon black to be produced. Generally, the cross sectional area of the reaction flow passage defined by sidewall 48 in a plane normal to the reactor axis will be in the range of from about 2.8 to about 13 times larger than the cross sectional area of the reaction passage at the throat 34. An expansion ratio toward the lower end of this range tends to provide a carbon black product characterized by higher surface area and lower structure, while an expansion ratio toward the upper end of the range provides a carbon black product characterized by lower surface area and higher structure.

Where the production of a carbon black product characterized by higher structure is desired, the pyrolysis zone is provided with a plurality of abrupt expansions in the reaction flow passage. In the Figure, the upstream end of the pyrolysis zone 8 comprises serially arranged from the upstream end wall 46 a first generally cylindrical zone 50 having a first diameter and a second generally cylindrical zone 52 having a second diameter which is larger than the first diameter. Preferably, the first generally cylindrical zone 50 has a diameter sufficient so that the area ratio between the first generally cylindrical zone 50 and the throat 34 is in the range of from about 2.8:1 to about 13:1. The flow area ratio between the second generally cylindrical zone 52 and the first generally cylindrical zone 50 is preferably from about 1:1 to about 4:1. The first generally cylindrical zone 50 preferably has a length in the range of from about 0.1 to about 15 times the diameter of the throat 34, usually from about 0.5 to about 10 diameters. Preferably, an annular shoulder 54 separates the zones 50 and 52, because this design provides a good flow pattern.

The pyrolysis zone 8 is further provided with a means 56 for supplying cooling fluid to the reaction flow passage. Generally, the means 56 comprises ports 58 opening into the pyrolysis zone 8. Preferably, at least one of the ports 58 carries a tube and spray nozzle assembly 60 for introducing a quench fluid into the zone 8 to stop the pyrolysis reaction. Generally, the means 56 will be positioned downstream of the outlet of the throat at a distance of from about 5 to about 45 throat diameters, usually at a distance of between about 8 and about 20 throat diameters. In other terms, the means 56 will be positioned between about 1.5 feet and about 20 feet downstream of the throat. Positioning the means 56 close to the throat produces low photolometer product. Usually, the means 56 is positioned downstream from the throat at a distance to produce a photolometer value of at least about 70 and is preferably designed to spray water. Further downstream of the quench means 56, the reaction mixture is further cooled to facilitate handling, and can be processed in conventional equipment.

Certain aspects of the invention are carried out according to a process comprising flowing a stream of hot combustion gases having a temperature sufficiently high to decompose a carbonaceous feedstock and form carbon black sequentially through a converging zone, a throat and an abruptly diverging zone; and introducing the carbonaceous feedstock transversely into the stream of hot combustion gases from the periphery of the stream for decomposition to form the carbon black.

Generally, the oxidant fluid comprises air, since it is inexpensive and plentiful, preferably preheated air at a temperature of from about 700° to about 1250° F., since employing preheated air is an inexpensive method of supplying heat to the reactor to drive the pyrolysis reaction and aids in forming a high-structure product. Of course, pure oxygen or oxygen-enriched air is also suitable, and besides having the advantage of producing a higher structure product, is the preferred oxidant where a low BTU fuel is burned.

Generally, the combustible fluid will comprise mostly methane, because methane is the major component of natural gas and synthetic natural gas and these materials are suitable combustible fluids and are inexpensive. Other combustible fluids, containing one or more components, for example selected from hydrogen, carbon monoxide, acetylene and propane are also suitable. An inexpensive fuel commonly found in a carbon black plant comprises off-gases from the filter bags, especially from soft black manufacture. This fuel is a low-BTU fuel, containing about 100 BTU/SCF, and generally 25–30 vol% or so of $H_2$ and CO.

Liquid fuels such as are used in some conventional carbon black plants can also be used in the present invention. In some plants part of the feedstock is used as fuel.

Generally, stoichiometric or excess air is mixed with the combustible fluid and ignited as the mixture is introduced into the combustion zone. By stoichiometric is meant an amount which results in the essential absence of both molecular oxygen and combustible materials in the combustion gases. A greater than stoichiometric amount of air, commonly called "excess" air, will result in the presence of reactive oxygen in the combustion gases. Fifty percent excess air is frequently used in carbon black manufacturing processes, and this means that 150% of the stoichiometric amount of air has been mixed with the combustible fluid.

Of course, the "excess" air partly consumes the carbonaceous feedstock and therefore results in lost yield. There are at least two reasons, however, why its presence can be desirable. First, as the excess air reacts with the feedstock, it generates both turbulence and heat, and therefore a finer and more uniform carbon black product. Secondly, the excess air dilutes the combustion gases and reduces their temperature, protecting equipment. However, where the reactor is capable of withstanding the temperatures of near stoichiometric combustion of the air and fuel and concomitantly generates sufficient turbulence downstream of the feedstock injection to form the desired particle size of carbon black, and the combustion gas stream contains sufficient heat to pyrolyze the feedstock particles, excess air can be avoided, since it results in reduced yields due to combustion of a portion of the feedstock.

Where natural gas is used as the combustible fluid, it is preferably mixed with air at a volume ratio of from about 10:1, which is near stoichiometric, to about 20:1, which would be about 100% excess air. At reactor conditions, the combustion gases pass through the throat at a temperature in the range of 2400°–3000° F., and at a velocity generally in the range of Mach 0.2–1.0, usually between about 0.3 to about 0.7. Mach 1 in feet per second is roughly equal to $49.01 \sqrt{T}$, where T is the temperature in °R (Rankine) at reactor conditions, (T°R=T°F.+460). Higher temperatures and velocities yield desirable products, but cause unduly expensive operation.

The carbonaceous feedstock which is injected into the combustion gas stream from its periphery is generally any of the hydrocarbon feeds suitable for forming carbon black. Generally, the carbonaceous feedstock will be a liquid, contain about 90 weight percent carbon and have a density greater than that of water. Preferably, the feedstock will be characterized by a Bureau of Mines Correlation Index, BMCI of between about 90 and about 150. The carbonaceous feedstock is preferably preheated to a temperature in the range of 250 to about 500° F. prior to injection into the combustion gases. It is important that the streams of feedstock do not penetrate sufficiently far to impinge on the wall of the reactor. However, to insure adequate dispersal, it is preferred that the feedstock be injected at a pressure of at least 50 psig. If desired, the same carbonaceous feedstock can also be introduced into the reactor from a position along the reactor axis. It will be appreciated that injecting the feedstock through a smaller orifice requires a higher pressure to achieve the same penetration.

According to certain aspects of the present invention, the carbonaceous feedstock is introduced into the converging zone from the periphery thereof.

By injecting the carbonaceous feedstock transversely into the converging combustion gases, there can be provided a novel carbon black product having a CTAB surface area in the range of between about 50 and about 500 m$^2$/g, usually between about 50 and about 200 m$^2$/g, most preferably between about 70 and 150 m$^2$/g, which is characterized by a "G index" value of less than about 1.2, between about 1.0 and 1.2, such as between 1.1 and 1.2 preferably between 1.15 and 1.20. This type of carbon black can be characterized by a tint residual of about plus 12 or greater and occasionally plus 16 or greater (See tabulated runs in subsequent tables.) Such a carbon black can be usefully compounded into rubber to impart certain desirable properties thereto. The CTAB surface area of a carbon black sample is measured in accordance with ASTM and is generally considered to have a correlation with the surface area of the carbon black sample available for reinforcing rubber. The "G index" value is calculated in accordance with Applied Optics 19, 2977 (1980) and as herein described in Example III and correlates with the breadth of distribution of the aggregate particle sizes in the sample. A "G index" value of less than 1.25 indicates an extremely homogeneous product, with the sizes of the aggregates being extremely uniform, relatively speaking. "Conventional" furnace blacks have a "G index" value in the range of about 1.4–1.6.

The carbonaceous feedstock can be introduced into the converging zone either as a coherent stream or as a spray, as desired. Preferably, the feedstock is introduced as a spray, because testing shows that spraying the feedstock into the reactor results in the higher yield of product. The feedstock can be introduced into the converging zone in a direction normal to the axis of the reactor flow path, which is preferred, since it has been tested with good results, or it can be introduced into the combustion gases with a flow component cocurrent or countercurrent to the combustion gas flow. Where the feedstock is to be introduced into the reactor with a flow component countercurrent to the flow of the combustion gas stream, it may be desirable to utilize a coherent stream of feedstock, to mitigate impingement of feedstock on the reactor wall.

According to another aspect of the invention the carbonaceous feedstock is sprayed inwardly into the combustion gas stream flowing through the reactor throat, preferably radially inwardly, or, if desired, canted in the upstream or preferably, the downstream direction. Spraying the feedstock into the throat as a mist produces a higher surface area product than injecting coherent streams of feedstock into the throat under reactor conditions which are otherwise the same. Because the invention in this embodiment provides a method raising the surface area of the carbon black product at no increase in operating costs, it is a significant advance in the art.

In another aspect of the present invention, by introducing the carbonaceous feedstock radially inwardly transversely into the combustion gas stream downstream of the inlet to the converging section at a distance upstream of the pyrolysis section in the range of from about 0.05 to 0.9 throat diameters, preferably in the range of 0–4 inches upstream of the pyrolysis zone, more preferably in the range of 1–3 inches upstream of the pyrolysis zone, such as about 1.5 inches upstream of the pyrolysis zone, there can be provided a novel carbon black product having a CTAB surface area in the range of between about 50 and about 500 m$^2$/g, usually between about 50 and about 200 m$^2$/g, preferably between about 70 and about 150 m$^2$/g, which is characterized by a "G index" value of greater than about 1.85, preferably greater than about 2, such as in the range of 2 to 3, preferably between about 2.25 and about 2.75. This type of carbon black can be characterized by a tint residual value of minus 12 or lower and occasionally minus 16 or lower (See tabulated runs in subsequent tables.). A carbon black characterized by high "G index" value has a broad aggregate size distribution and imparts low hystersis properties to rubber into which it has been compounded. This carbon black will impart low rolling resistance to vehicular tires when it has been compounded into the rubber which forms them.

The invention is illustrated by the following Examples.

EXAMPLE I

The runs were made in a pilot plant reactor. A is the diameter of zone 10. B is the diameter of throat 34. C is the diameter of zone 52. D is the length of zone 10. E is the length of zone 32. $\alpha$ is the angle at which the sidewall of zone 32 converges toward the longitudinal axis of the reactor. F is the length of throat 34. G is the length of zone 52 from wall 46 to quench 60. H is the distance of oil injectors 40 upstream from wall 46, and J is the diameter of zone 16. The gas burner upstream of zone 10 was modified from that shown by the figure as follows:

Premixed air and fuel were supplied axially into the passage 16 through the end of a tube having a 4 inch inside diameter and terminating 2" upstream of wall 14. The end of the tube was partially closed by a radially inwardly extending annular flange having an inside diameter of 2.5 inches. Results are shown in Table I.

TABLE I

| RUN NUMBER | 1 | 2 | 3 | 4 | 5 | 6 | 7 | 8 | 9 | 10 | 11 | 12 |
|---|---|---|---|---|---|---|---|---|---|---|---|---|
| Reactor Dimensions, Ins. | | | | | | | | | | | | |
| A | 6 | 6 | 6 | 6 | 6 | 6 | 6 | 6 | 6 | 6 | 6 | 6 |
| B | 1.67 | 1.67 | 1.67 | 1.67 | 1.67 | 1.67 | 1.67 | 1.67 | 1.67 | 1.67 | 1.67 | 1.67 |
| C | 6 | 4 | 3 | 3 | $3 \times 6^{(a)}$ | 6 | 6 | 6 | 4 | 4 | 4 | 4 |
| D | 6 | 6 | 6 | 6 | 6 | 6 | 6 | 6 | 6 | 6 | 6 | 6 |
| E | 8.5 | 8.5 | 8.5 | 8.5 | 8.5 | 8.5 | 8.5 | 8.5 | 8.5 | 8.5 | 8.5 | 8.5 |
| F | 1.5 | 3.5 | 3.5 | 3.5 | 3.5 | 1.5 | 1.5 | 1.5 | 1.5 | 3.5 | 1.5 | 1.5 |
| G (Inlet C to Quench) | 36 | 23 | 64 | 72 | 39 | 35 | 33 | 23 | 20 | 25 | 50 | 35 |
| H | 1.5 | 1.5 | 6.5 | 6.5 | 6.5 | 1.5 | 1.5 | 1.5 | 1.5 | 3.5 | 4.5 | 4.5 |
| J | 4 | 4 | 4 | 4 | 4 | 4 | 4 | 4 | 4 | 4 | 4 | 4 |
| α Degrees, Approx. | 15 | 15 | 15 | 15 | 15 | 15 | 15 | 15 | 15 | 15 | 15 | 15 |
| Ratio C/B Diameters, Nozzle: | 3.6 | 2.4 | 1.8 | 1.8 | $1.8 \times 3.6^{(a)}$ | 3.6 | 3.6 | 3.6 | 2.4 | 2.4 | 2.4 | 2.4 |
| Orifice Diam. ins. | 0.032 | 0.039 | 0.039 | 0.039 | 0.039 | 0.032 | 0.032 | 0.028 | 0.039 | 0.039 | 0.039 | 0.039 |
| No. of Nozzles | 2 | 2 | 2 | 2 | 2 | 2 | 2 | 2 | 2 | 2 | 2 | 2 |
| Spacing, degrees | 180 | 180 | 180 | 180 | 180 | 180 | 180 | 180 | 180 | 180 | 180 | 180 |
| PROCESS FLOW | | | | | | | | | | | | |
| Total Air, SCF/hr. | 14036 | 14065 | 14024 | 13832 | 14002 | 13863 | 13948 | 14392 | 13982 | 14063 | 14113 | 14120 |
| Temperature, °C. | 410 | 414 | 413 | 563 | 562 | 413 | 412 | 410 | 561 | 560 | 563 | 564 |
| Fuel, SCF/hr. | 875 | 886 | 884 | 885 | 886 | 879 | 883 | 1107 | 738 | 733 | 778 | 778 |
| BTU/SCF | 976 | 947 | 948 | 948 | 956 | 964 | 964 | 964 | 964 | 977 | 947 | 947 |
| Air/Fuel Gas. Vol. Ratio | 16 | 15.9 | 15.9 | 15.6 | 15.8 | 15.8 | 15.8 | 13.0 | 18.9 | 19.2 | 18.1 | 18.1 |
| Oil, GPH | 18.7 | 20.5 | 22.2 | 24.5 | 24.6 | 22.61 | 22.6 | 18.7 | 22.3 | 22.0 | 27.5 | 24.6 |
| API, 60° F./60° F. | −3.2 | −3.2 | −2 | −2 | −2 | −3.2 | −3.2 | −3.2 | −3.2 | −3.2 | −2.0 | −2.0 |
| Lbs/Gallon | 9.19 | 9.19 | 9.1 | 9.1 | 9.1 | 9.1 | 9.19 | 9.19 | 9.19 | 9.19 | 9.1 | 9.1 |
| BMCI | 140 | 140 | 138 | 138 | 138 | 140 | 140 | 140 | 140 | 140 | 138 | 138 |
| Carbon, wt. % | 91.5 | 91.3 | 91.3 | 91.3 | 91.3 | 91.5 | 91.5 | 91.5 | 91.5 | 91.5 | 91.3 | 91.3 |
| Temperature, °C. | 131 | 157 | 154 | 154 | 153 | 158 | 154 | 152 | 157 | 148 | 155 | 153 |
| Pressure, psig | 150 | 110 | 110 | 125 | 140 | 80 | 50 | 100 | 110 | 105 | 145 | 125 |
| Air to Oil, SCF/gal. | 751 | 686 | 632 | 565 | 569 | 613 | 617 | 770 | 627 | 639 | 513 | 574 |
| PRODUCT CARBON BLACK | | | | | | | | | | | | |
| Lbs/Gal. Feed | 4.68 | 4.7 | 4.8 | 5.2 | 5.3 | 5.33 | 5.2 | 5.6 | 4.7 | 4.4 | 5.0 | 4.8 |
| CTAB, m²/g | 108 | 115 | 108 | 105 | 107 | 77.5 | 85 | 110 | 122 | 117 | 101 | 113 |
| N₂SA, m²/g | 117 | 124 | 110 | 105 | 112 | 79.7 | 85 | 119 | 131 | 128 | 103 | 120 |
| 24M4 DBP, cc/100 g | 111 | 96 | 94 | 94 | 106 | 93.5 | 101 | 113 | 97 | 97 | 98 | 103 |
| Tint | 102.3 | 105.3 | 123.6 | 119.8 | 115.4 | 81.4 | 83.3 | 99.8 | 105.7 | 109.1 | 115.9 | 122.5 |
| Tint Residual | −5.5 | −9.4 | +8.9 | +7.2 | +4.9 | −15.3 | −16.1 | −8.4 | −11.6 | −5.6 | +6.9 | +9.9 |
| Photelometer | 79 | 74 | 77 | 78 | 82 | 75 | 79 | 80 | 84 | 80 | 80 | 73 |
| Lbs Black/Gal × CTAB M²/g | 505 | 541 | 518 | 546 | 567 | 413 | 442 | 616 | 573 | 515 | 505 | 542 |
| Lbs Black/Lb C in Feed | 0.5566 | 0.5602 | 0.5777 | 0.6259 | 0.6379 | 0.5800 | 0.5658 | 0.6094 | 0.5114 | 0.4788 | 0.5495 | 0.5276 |

TABLE I-continued

| | | | | | | | | | | | |
|---|---|---|---|---|---|---|---|---|---|---|---|
| Lbs Black/Lb C in Feed × CTAB m²/g | 60.1 | 64.4 | 62.4 | 65.7 | 68.3 | 44.9 | 48.1 | 67.0 | 62.4 | 54.0 | 55.5 | 59.6 |
| Oil-Lbs Carbon/Gallon | 8.41 | 8.39 | 8.31 | 8.31 | 8.31 | 8.41 | 8.41 | 8.41 | 8.41 | 8.41 | 8.31 | 8.31 |
| Lbs Carbon/Hr-Fuel | 27.7 | 28.1 | 28.1 | 28.1 | 28.1 | 28.1 | 28.0 | 35.1 | 23.4 | 23.4 | 24.6 | 24.6 |
| Lbs Carbon/Hr-Oil | 157.3 | 172 | 184.5 | 203.6 | 204.4 | 190.2 | 190.1 | 157.3 | 187.5 | 185 | 228.5 | 204.4 |
| Total Lbs Carbon/Hour | 185 | 200.1 | 212.6 | 231.7 | 232.5 | 218.3 | 218.1 | 192.4 | 210.9 | 208.4 | 253.1 | 229 |
| Lbs CB/Hour | 87.5 | 96.4 | 106.6 | 127.4 | 130.4 | 120.5 | 117.5 | 104.7 | 104.8 | 96.8 | 137.5 | 118.1 |
| Lbs CB/Lb-Total C | 0.4730 | 0.4814 | 0.5014 | 0.5498 | 0.5609 | 0.5520 | 0.5387 | 0.5442 | 0.4969 | 0.4645 | 0.5433 | 0.5157 |
| Lbs CB/Lbs Total C × CTAB | 51.1 | 55.4 | 54.2 | 57.7 | 60.0 | 42.7 | 45.8 | 59.9 | 60.6 | 54.3 | 54.9 | 58.3 |

| RUN NUMBER | 13 | 14 | 15 | 16 | 17 | 18 |
|---|---|---|---|---|---|---|
| Reactor Dimensions, Ins. | | | | | | |
| A | 6 | 6 | 6 | 6 | 6 | 6 |
| B | 1.67 | 1.67 | 1.67 | 1.67 | 1.67 | 1.67 |
| C | 4 | 4 | 4 | 6 × 8(b) | 6 × 8(b) | 6 |
| D | 6 | 6 | 6 | 6 | 6 | 6 |
| E | 8.5 | 8.5 | 8.5 | 8.5 | 8.5 | 8.5 |
| F | 1.5 | 1.5 | 3.5 | 1.5 | 1.5 | 1.5 |
| G (Inlet C to Quench) | 25 | 19 | 27 | 72 | 72 | 50 |
| H | 4.5 | 4.5 | 6.5 | 1.5 | 1.5 | 1.5 |
| J | 4 | 4 | 4 | 4 | 4 | 4 |
| α Degrees, Approx. | 15 | 15 | 15 | 15 | 15 | 15 |
| C/B Diameters, Ratio | 2.4 | 2.4 | 2.4 | 3.6 × 4.8(c) | 3.6 × 4.8(c) | 3.6 |
| Nozzle: | | | | | | |
| Orifice Diam. ins. | 0.039 | 0.039 | 0.039 | 0.032 | 0.032 | 0.032 |
| No. of Nozzles | 2 | 2 | 2 | 3 | 3 | 3 |
| Spacing, degrees | 180 | 180 | 180 | (c) | (c) | (c) |
| PROCESS FLOW | | | | | | |
| Total Air, SCF/hr. | 14109 | 14134 | 14112 | 14281 | 14281 | 10331 |
| Temperature, °C. | 562 | 561 | 559 | 562 | 562 | 558 |
| Fuel, SCF/hr | 778 | 778 | 880 | 730 | 731 | 523 |
| BTU/SCF | 947 | 947 | 977 | 974 | 974 | 974 |
| Air/Fuel Gas. Vol. Ratio | 18.1 | 18.2 | 16.0 | 19.6 | 19.5 | 19.8 |
| Oil, GPH | 22.3 | 20.6 | 20.3 | 27.3 | 30.03 | 18.05 |
| API, 60° F./60° F. | −.2 | −.2 | −.2 | −3.2 | −3.2 | −3.2 |
| Lbs/Gallon | 9.1 | 9.1 | 9.1 | 9.19 | 9.19 | 9.19 |
| BMCI | 138 | 138 | 138 | 140 | 140 | 140 |
| Carbon, wt. % | 91.3 | 91.3 | 91.3 | 91.5 | 91.5 | 91.5 |
| Temperature, °C. | 152 | 150 | 149 | 162 | 162 | 152 |
| Pressure, psig | 110 | 95 | 100 | 120 | 170 | 110 |
| Air to Oil, SCF/gal. | 632 | 686 | 695 | 530 | 475 | 572 |
| PRODUCT CARBON | | | | | | |

TABLE I-continued

| BLACK | | | | | | |
|---|---|---|---|---|---|---|
| Lbs/Gal. Feed | 4.4 | 4.1 | 4.4 | 5.15 | 5.44 | 4.9 |
| CTAB, m²/g | 135 | 149 | 137 | 85 | 67 | 91.1 |
| N₂SA, m²/g | 143 | 176 | 155 | 87 | 68 | 95.0 |
| 24M4 DBP, cc/100 g | 105 | 107 | 108 | 98 | 92 | 103 |
| Tint | 130.7 | 134.2 | 128 | 89.1 | 75.6 | 95.1 |
| Tint Residual | +10.9 | +14.6 | +10.5 | −10.9 | −14.8 | −6.8 |
| Photelometer | 83 | 82 | 82 | 95 | 71 | 85 |
| Lbs Black/Gal × CTAB M²/g | 594 | 611 | 603 | 438 | 365 | 446 |
| Lbs Black/ Lb C in Feed | 0.4835 | 0.4505 | 0.4835 | 0.6125 | 0.6469 | 0.5826 |
| Lbs Black/Lb C in Feed × CTAB m²/g | 65.3 | 67.1 | 66.2 | 52.1 | 43.3 | 53.1 |
| Oil-Lbs Carbon/ Gallon | 8.31 | 8.31 | 8.31 | 8.41 | 8.41 | 8.41 |
| Lbs Carbon/Hr-Fuel | 24.6 | 24.6 | 27.9 | 25.5 | 25.8 | 16.6 |
| Lbs Carbon/Hr-Oil | 185.3 | 171.2 | 168.7 | 230.1 252.5 | 151.8 | 168.4 |
| Total Lbs Carbon/Hour | 209.9 | 195.8 | 196.6 | 255.6 | 278.3 | |
| Lbs CB/Hour | 98.1 | 84.5 | 89.3 | 141.1 | 164.3 | 88.4 |
| Lbs CB/Lb-Total C | 0.4674 | 0.4316 | 0.4542 | 0.551 | 0.59 | 0.5249 |
| Lbs CB/Lbs Total C × CTAB | 63.1 | 64.3 | 62.2 | 46.8 | 39.5 | 47.8 |

(a)This is a two stage or stepped zone. The 3 inch diameter zone was 9 inches in length for run 5, and the 6 inch diameter zone was 30 inches in length to quench injection.
(b)This is a two stage or stepped zone. The 6 inch diameter zone was 38 inches long in both runs 16 and 17, and the 8 inch diameter zone was 34 inches in length for both runs;
(c)3 nozzles spaced at 90°. Two nozzles are 180° apart, with the third nozzle in between at 90° from the two nozzles which are 180° apart.

Runs 1, 2 and 3 show decreases in air-to-oil ratio, SCF/gallon, of 750, 685, and 630, respectively; decreases in diameter of zone C, in inches, of 6, 4, and 3, respectively; increases in H, in inches, of 1.5, 1.5, and 6.5, respectively; and increases in F, in inches, of 1.5, 3.5, and 3.5, respectively, cause increased carbon black production, in pounds per hour, of from 87.5 to 96.4, to 106.6, respectively, with increases in pounds of carbon black per gallon of feed oil from 4.68, to 4.7, to 4.8, respectively. The CTAB values, in $m^2/g$, would be expeccted to decrease from run 1 through run 3 because of the decreases in air-to-oil ratio from run 1 through run 3. However, run 1 and run 3 had the same 108 CTAB values, and, unexpectedly, run 2 had a very high CTAB value of 115. The 24M4 values, in cc/100 g., decreased from 111 to 96 to 94, respectively from run 1 through run 3, due to these changes.

When the air preheat was increased from 413° C. for run 3 to 563° C. for run 4, the production of carbon black increased from 4.8 to 5.2 pounds of carbon black per gallon of feedstock. The CTAB values remained about the same, and the tint residuals were about the same at +8.9 and +7.2, respectively.

Runs 4 and 5 shows that changing the dimensions of C, using a 3 inch diameter throughout for 72 inches in run 4, but using C of 3 inches diameter for 9 inches and then 6 inches in diameter for 30 inches to quench for run 5, there resulted in an extremely large gain in 24M4 value for run 5 from 94 for run 4 to 106 for run 5, at about the same CTAB values and at about the same tint residuals. In addition, the change in C in run 5 increased the yield of carbon black in pounds per gallon of oil, this quantity being 5.2 for run 4 and 5.3 for run 5. Runs, 1, 2 and 3 had values of 4.68, 4.7, and 4.8, respectively, for carbon black yields in pounds per gallon.

Runs 6 through 15 show the effects of the position of the oil injection H on tint residuals. Runs 6 and 7 had H values of 1.5 inches, the oil being added 1.5 inches upstream from the throat outlet, and the tint residuals were −15.3 and −16.1, respectively, for runs 6 and 7. The H values for runs 14 and 15 were 4.5 and 6.5 inches upstream from the throat outlet, respectively, and the tint residuals were +14.6 and +10.5, respectively, for runs 14 and 15. This change in H shows the flexibility of the operation for producing carbon blacks of broad aggregate distribution (runs 6 and 7) and of narrow aggregate size distribution (runs 14 and 15).

Runs 16 and 17 used the two-step reaction zone, as disclosed, and with H values of 1.5 inches, produced tint residuals of −10.9 and −14.8, respectively, using the different nozzle arrangement as compared with runs 1 through 15, as defined herein. The CTAB values were 85 and 67, respectively, using air-to-oil ratios of 530 and 475, respectively, for runs 16 and 17, and tint residuals of −10.9 and −14.8, respectively.

Run 18 used a one-step or 6 inch diameter zone C for the reactor and used the same nozzle arrangement as in runs 16 and 17, with H of 1.5 inches, and produced a tint residual of −6.8.

EXAMPLE II

The runs were made in a commercial size plant reactor. A–J were measured in the same manner as in Example I. A is 28 inches. B is 12 inches. C is 20.5 inches. D is 3 feet 9 inches. E is 2 feet. F is 4 inches. G and H are shown in Table II. J is 18 inches. K is the diameter of flange 29, which seals the end of gas tube 23, and is 10 inches. L is the length of ring 28, and is 14 inches. α is 18°26′. Results are shown in Table II.

| RUN NUMBER | 19 | 20 | 21 | 22 | 23 | 24 | 25 | 26 | 27 | 28 | 29 | 30 | 31 | 32 | 33 |
|---|---|---|---|---|---|---|---|---|---|---|---|---|---|---|---|
| Black Type | N299 | N299 | N299 | N299 | N299 | N299 | N299 | N299 | N299 | N299 | N299 | N299 | N299 | N299 | N351 |
| Reactor Dimensions, Ins. | | | | | | | | | | | | | | | |
| A to F, J & K— See Above | | | | | | | | | | | | | | | |
| G | 9'11" | 9'11" | 9'11" | 9'11" | 9'11" | 9'11" | 9'11" | 9'11" | 9'11" | 9'11" | 9'11" | 9'11" | 9'11" | 9'11" | 14'5" |
| H, inches | 16 | 16 | 16 | 16 | 16 | 16 | 16 | 16 | 16 | 16 | 16 | 16 | 16 | 16 | 16 |
| Oil Nozzle: | | | | | | | | | | | | | | | |
| Number at 60° spacing | 6 | 6 | 6 | 6 | 6 | 6 | 6 | 6 | 6 | 6 | 6 | 6 | 6 | 6 | 6 |
| Diameter (orifice) | 2⅛" 4 7/64" | 2⅛" 4 7/64" | 2⅛" 4 7/64" | 2⅛" 4 7/64" | 2⅛" 4 7/64" | 2⅛" 4 7/64" | 2⅛" 4 7/64" | 2⅛" 4 7/64" | 2⅛" 4 7/64" | 2⅛" 4 7/64" | 2⅛" 4 7/64" | 2⅛" 4 7/64" | 2⅛" 4 7/64" | 2⅛" 4 7/64" | 2⅛" 4 7/64" |
| Type | JETS | JETS | JETS | JETS | JETS | JETS | JETS | JETS | JETS | JETS | JETS | JETS | JETS | JETS | JETS |
| Rates & Conditions | | | | | | | | | | | | | | | |
| Process Air, MSCFH | 657.6 | 668.8 | 657.3 | 653.0 | 661.8 | 655.3 | 656.2 | 643.4 | 654.0 | 649.5 | 647.3 | 639.8 | 639.8 | 638.0 | 586.4 |
| Jacket Air, MSCFH | 8.1 | 8.1 | 8.1 | 8.1 | 8.1 | 8.1 | 8.1 | 8.1 | 8.1 | 8.1 | 8.0 | 8.1 | 8.1 | 7.8 | 8.3 |
| Total Air, MSCFH | 665.7 | 676.9 | 665.4 | 661.1 | 669.9 | 663.4 | 664.3 | 651.5 | 662.1 | 657.6 | 655.3 | 647.9 | 647.9 | 645.8 | 594.7 |
| Air Temp, °F. | 1183 | 1184 | 1180 | 1192 | 1190 | 1190 | 1195 | 1205 | 1208 | 1205 | 1207 | 1246 | 1246 | 1196 | 1204 |
| Fuel Gas, MSCFH | 39.4 | 39.5 | 39.5 | 39.2 | 40.0 | 40.0 | 39.7 | 38.7 | 39.6 | 39.4 | 39.5 | 39.3 | 39.3 | 38.6 | 38.8 |
| Fuel Gas, BTU/SCF | 869 | 871 | 868 | 875 | 872 | 872 | 867 | 874 | 870 | 868 | 872 | 870 | 870 | 882 | 875 |
| Air/Gas Ratio | 16.9 | 17.1 | 16.8 | 16.9 | 16.7 | 16.6 | 16.7 | 16.8 | 16.7 | 16.7 | 16.6 | 16.5 | 16.5 | 16.7 | 15.3 |
| Oil Rate, gph | 1212 | 1227 | 1232 | 1219 | 1202 | 1202 | 1192 | 1174 | 1190 | 1159 | 1142 | 1178 | 1178 | 1162 | 1337 |
| °API | 7.1 | 7.1 | 7.0 | 7.0 | 6.8 | 6.8 | 6.8 | 6.0 | 6.0 | 5.6 | 5.6 | 5.5 | 5.5 | 5.5 | 6.0 |
| BMCI | 8.51 | 8.51 | 8.51 | 8.51 | 8.53 | 8.53 | 8.53 | 8.53 | 8.58 | 8.60 | 8.60 | 8.60 | 8.61 | 8.61 | 8.58 |
| C, wt % | 100 | 100 | 100 | 100 | 101 | 101 | 101 | 103 | 103 | 104 | 104 | 104 | 104 | 104 | 103 |
| Temp. °F. | 88.4 | 88.4 | 88.4 | 88.4 | 88.4 | 88.4 | 88.4 | 88.4 | 88.4 | 88.4 | 88.4 | 88.4 | 88.4 | 88.4 | 88.4 |
| Pressure, psig | 450 | 450 | 450 | 450 | 450 | 450 | 450 | 450 | 450 | 450 | 450 | 450 | 450 | 450 | 450 |
| Air/Oil Ratio, SCF/gal | 150 | 160 | 155 | 155 | 152 | 150 | 150 | 150 | 150 | 180 | 140 | 145 | 145 | 140 | 180 |
| Product | 549 | 552 | 540 | 542 | 551 | 552 | 557 | 555 | 556 | 567 | 574 | 550 | 550 | 556 | 445 |
| Yield, lbs/gal | 4.17 | 4.14 | 4.18 | 4.29 | 4.14 | 4.21 | 4.16 | 4.21 | 4.28 | 4.22 | 4.29 | 4.38 | 4.38 | * | 4.93 |
| CTAB, m²/g | 99 | 99 | 97 | 96 | 97 | 96 | 98 | 98 | 99 | 98 | 100 | 101 | 97 | 101 | 72 |
| N₂SA, m²/g | 114 | 113 | 105 | 106 | 107 | 107 | 109 | 111 | 114 | 109 | 118 | 106 | 110 | 114 | 73 |
| 24M4-DBP, cc/100 g | 101 | 102 | 102 | 103 | 101 | 102 | 105 | 101 | 99 | 98 | 101 | 105 | 102 | 101 | 98 |
| Tint | 112 | 110 | 110 | 109 | 114 | 112 | 111 | 110 | 112 | 109 | 119 | 118 | 118 | 118 | 102 |
| Tint Residual | +8.2 | +5.9 | +5.4 | +5.2 | +9.6 | +8.0 | +7.6 | +5.3 | +6.7 | +3.5 | +14.7 | +11.2 | +13.9 | +12.6 | +10.0 |
| (Lbs CB/gal) × (CTAB) | 413 | 410 | 405 | 412 | 402 | 404 | 409 | 413 | 424 | 414 | 429 | 442 | 425 | — | 355 |
| Lbs CB/Lb C in oil | 0.554 | 0.551 | 0.556 | 0.570 | 0.549 | 0.559 | 0.553 | 0.555 | 0.565 | 0.555 | 0.563 | 0.576 | 0.576 | — | 0.650 |
| Lbs CB/Lb C in oil × CTAB | 54.8 | 54.5 | 53.9 | 54.7 | 53.3 | 53.6 | 54.2 | 54.4 | 55.9 | 54.4 | 56.3 | 58.1 | 55.8 | — | 46.8 |
| 325 mesh grit, wt % | — | — | * | — | — | — | — | — | — | — | — | 0.0090 | — | — | — |

| RUN NUMBER | 34 | 35 | 36 | 37 | 38 | 39 | 40 | 41 | 42 | 43 | 44 | 45 | 46 |
|---|---|---|---|---|---|---|---|---|---|---|---|---|---|
| Black Type | N351 | N299 | N299 | N299 | N299 | N299 | N234 | N234 | N234 | N299 | N299 | N234 | N299 |
| Reactor Dimensions, Ins. | | | | | | | | | | | | | |
| A to F, J & K— See Above | | | | | | | | | | | | | |
| G | 14'5" | 9'11" | 9'11" | 9'11" | 9'11" | 9'11" | 8'2" | 8'2" | 8'2" | 9'11" | 9'11" | 9'11" | 9'11" |
| H, inches | 16 | 16 | 16 | 16 | 16 | 16 | 16 | 16 | 16 | 6 | 6 | 6 | 6 |

-continued

| Oil Nozzle: | | | | | | | | | | | | | |
|---|---|---|---|---|---|---|---|---|---|---|---|---|---|
| Number at 60° spacing | 6 | 6 | 6 | 6 | 6 | 6 | 6 | 6 | 6 | 6 | 6 | 6 | 6 |
| Diameter (orifice) | 2⅛″ 4 7/64″ | (a) | (a) | (a) | (a) | | | | | | | | |
| Type | Jets | (b) | (b) | (b) | (b) | (e) | (e) | (e) | (e) | (e) | (e) | (e) | JETS |
| Rates & Conditions | | | | | | | | | | | | | |
| Process Air, MSCFH | 586.4 | 669.8 | 660 | 660 | 659.9 | 657.1 | 666.7 | 666.7 | 666.7 | 659.2 | 651.2 | 647.9 | 659.1 |
| Jacket Air, MSCFH | 8.3 | 8.2 | 8.1 | 8.1 | 8.2 | 8.3 | 8.1 | 8.1 | 8.1 | 8.1 | 8.1 | 8.1 | 8.1 |
| Total Air, MSCFH | 594.7 | 678.0 | 668.1 | 668.1 | 668.1 | 665.4 | 674.8 | 674.8 | 674.8 | 667.3 | 659.3 | 656.0 | 667.2 |
| Air Temp, °F. | 1204 | 1216 | 1208 | 1208 | 1204 | 1211 | 1201 | 1201 | 1201 | 1201 | 1194 | 1200 | 1213 |
| Fuel Gas, MSCFH | 38.8 | 40.9 | 40.6 | 40.6 | 41.9 | 41.5 | 42.1 | 42.1 | 42.1 | 42.0 | 42.4 | 42.1 | 42.1 |
| Fuel Gas, BTU/SCF | 875 | 867 | 871 | 871 | 867 | 867 | 863 | 863 | 863 | 866 | 865 | 868 | 870 |
| Air/Gas Ratio | 15.3 | 16.6 | 16.5 | 16.5 | 15.9 | 16.0 | 16.0 | 16.0 | 16.0 | 15.9 | 15.5 | 15.6 | 15.8 |
| Oil Rate, gph | 1337 | 1195 | 1253 | 1253 | 1235 | 1260 | 1120 | 1120 | 1120 | 1278 | 1263 | 1135 | 1243 |
| °API | 6.0 | 6.3 | 6.4 | 6.4 | 6.4 | 6.6 | 6.9 | 6.9 | 6.9 | 6.9 | 7.5 | 7.5 | 6.9 |
| Lb/gal | 8.58 | 8.56 | 8.55 | 8.55 | 8.55 | 8.54 | 8.52 | 8.52 | 8.52 | 8.52 | 8.48 | 8.48 | 8.52 |
| BMCI | 103 | 102 | 102 | 102 | 102 | 101 | 100 | 100 | 100 | 100 | 98 | 98 | 100 |
| C, wt % | 88.4 | 88.4 | 88.4 | 88.4 | 88.4 | 88.4 | 88.4 | 88.4 | 88.4 | 88.4 | 88.4 | 88.4 | 88.4 |
| Temp, °F. | 450 | 450 | 450 | 450 | 450 | 450 | 450 | 450 | 450 | 450 | 450 | 450 | 450 |
| Press, psig | 180 | 210 | 220 | 220 | 210 | 240 | 190 | 190 | 190 | 240 | 310 | 280 | 210 |
| Air/Oil Ratio, SCF/gal | 445 | 567 | 533 | 533 | 541 | 528 | 602 | 602 | 602 | 522 | 522 | 578 | 537 |
| Product | ** | * | ** | ** | * | * | ** | * | * | * | * | * | * |
| Yield, lbs/gal | 4.93 | 4.13 | 4.36 | 4.36 | 4.30 | 4.46 | 4.08 | 4.08 | 4.08 | 4.08 | 4.36 | 4.15 | 4.39 |
| CTAB, m²/g | 79 | 106 | 94 | 96 | 100 | 104 | 119 | 120 | 115 | 100 | 103 | 114 | 100 |
| N₂SA, m²/g | 75 | 129 | 100 | 102 | 112 | 115 | 143 | 141 | 124 | 109 | 109 | 130 | 106 |
| 24M4-DBP, cc/100 g | 103 | 102 | 102 | 103 | 101 | 101 | 102 | 103 | 106 | 104 | 100 | 99 | 97 |
| Tint | 98 | 116 | 111 | 109 | 112 | 115 | 120 | 120 | 117 | 114 | 118 | 121 | 112 |
| Tint Residual | +2.4 | +9.9 | +7.7 | +4.6 | +6.4 | +7.4 | +9.0 | +7.8 | +5.5 | +8.1 | +9.5 | +9.0 | +3.8 |
| (Lbs CB/gal) × (CTAB) | 389 | 438 | 410 | 419 | 430 | 464 | 486 | 490 | 469 | 446 | 449 | 473 | 439 |
| Lbs CB/Lb C in oil | 0.650 | 0.546 | 0.577 | 0.577 | 0.570 | 0.590 | 0.542 | 0.542 | 0.542 | 0.593 | 0.582 | 0.554 | 0.583 |
| Lbs CB/Lb C in oil × CTAB | 51.4 | 57.9 | 54.2 | 55.3 | 57.0 | 61.4 | 64.5 | 65.0 | 62.3 | 59.3 | 59.9 | 63.2 | 58.3 |
| 325 mesh grit, wt % | 0.0055(c) 0.0101(d) | — | — | 0.0022(c) | — | — | — | — | 0.0051(e) | — | — | — | — |

*Unpelleted
**Pelleted
(a) 2 tubes, orifice nozzles, 7/64″ diameter orifices; and 4 sprays, ⅛ G1514, as shown on page 19 of The Spraying Systems Catalog Number 27.
(b) 2 orifices or jets, 4 sprays
(c)Invention run
(d)Conventional carbon blacks
(e) 6 sprays, ⅛ G1514, as shown on page 19 of The Spraying Systems Catalog Number 27.

The photometer values of blacks of Example II ranged from about 75 to about 90 (ASTM D 1618-80).

Plant runs 19 through 46 show that different tread blacks are made (N299, N351 and N234) in the operations. Runs 19 through 34 used only jets. Runs 35 through 38 used jets and sprays. Runs 39 through 45 used all sprays. Run 46, again, used all jets.

Comparing runs 37, 38, and 39, producing N299 type carbon black, and using substantially the same operating conditions, runs 37 and 38 (all jets) produced 4.36 and 4.30 pounds of carbon black per gallon of oil, respectively, while run 39 (all sprays) produced 4.46 pounds of carbon black per gallon of oil. All had about the same tint residual of +4.6, +6.4 and +7.4, respectively. With the sprays of run 39, higher CTAB black was made (smaller nodules) and unexpectedly at higher yield, than in runs 37 and 38.

EXAMPLE III

Samples of the blacks obtained from runs 6, 7, 8, 11, 12, 13 and 14 above were analyzed according to the following procedure.

Determination of G (Aggregate Size Distribution Breadth Index)

Carbon blacks were dispersed in a 10-mM (10 millimolar) aqueous solution of sodium dioctylsulfosuccinate, an anionic surfactant trade named Aerosol OT (CAS Registry 577-11-7). The solution was cleaned by passing it through a 0.45-$\mu$m Millipore filter before use. Complete dispersion of the carbon blacks was accomplished with a magnetically stirred ultrasonic cleaning bath (U.S. Pat. No. 3,807,704, issued 1974, licensed to Lako Manufacturing Company). This bath combines mechanical stirring with ultrasonic agitation to obtain synergistic enhancement of rates of dispersion. Masterbatch slurries at concentrations of about 2 mg per milliliter (50 mg of black plus 25 milliliters of liquid) were initially treated 30 minutes in the bath. These were then diluted 100-fold (250 $\mu$liter of slurry plus 25 milliliters of liquid) and further sonified for 150 minutes. All masses and volumes were determined by weighing on a five-place analytical balance; precise concentrations c ($\mu$g/milliliter) were calculated from these weights.

Measurements were made of "dimensionless optical density spectra" defined as $$DODS_{obs.} = \rho \lambda c^{-1} b^{-1} \log(I_o/I) \quad (I)$$

wherein $\rho$ is the density of carbon black, taken as 1.85 g/cc. The remaining symbols have their usual photometric significance and are set out below.

Optical absorbance readings, $\log(I_o/I)$, where $I_o$ is incident intensity and $I$ is transmitted intensity, were obtained at 50-nm intervals in incident wavelength $\lambda_o$ from 350 to 1000 nm, using a Beckman Model B spectrophotometer and cuvettes having optical path length b=10.0 mm. The raw absorbance readings were converted to $DODS_{obs}$ values according to equation I. $\lambda$ is the wavelength in the suspension medium of refractive index $m_2$, and $\lambda = \lambda o/m_2$, where $\lambda_o$ is the vacuum wavelength. For the aqueous medium used, $m_2 = 1.324 + 3046/\lambda_o^2$.

To determine G, the theoretical quantity $DODS_{calc}$ is matched with the observed quantity $DODS_{obs}$ using an iterative least-squares technique. The problem is to find the minimum of $$s^2[n,k,f(X)] = (N^*)^{-1} \sum_{j=1}^{N} [DODS_{calc}(\lambda_o)_j - DODS_{obs}(\lambda_o)_j]^2 \quad (II)$$

with respect to parameters of the carbon black aggregate size distribution f(X), and with respect to the complex refractive index, $n-k\sqrt{-1}$, of carbon black. Under the constraint $$[(1-n)^2+k^2]/[(1+n)^2+k^2]=0.195, \quad (III)$$

this can be accomplished by means of a conventionally organized general-purpose nonlinear least-squares (Gauss-Newton iterative variance minimization) computer program in which is embedded a fully rigorous Mie-theory subroutine for furnishing $DODS_{calc}$ function values and the necessary partial derivatives, the latter being obtained numerically. In equation (II), f(X) is a normalized particle diameter distribution function and $N^*$ denotes statistical degrees of freedom. The expression for $DODS_{calc}$ is $$DODS_{calc} = \frac{\lambda <C_{ext}>}{\ln 10 <\pi X^3/6>} \quad (IV)$$

where $<C_{ext}>$ is number-average extinction cross section of the carbon black aggregates, and $<\pi X^3/6>$ is their number average volume. $C_{ext}$ is calculated for each aggregate size X by Mie theory for a sphere of diameter X. The statistical distribution of X by frequency was assumed to be of log-normal form:

$$f(X) = \frac{1}{X\sqrt{2\pi} \ln G} \exp\left[\frac{1}{2}\left(\frac{\ln X/X_g}{\ln G}\right)^2\right] \quad (V)$$

where G is the breadth index for the distribution and $X_g$ is the geometric mean of sphere diameters.

The carbon black samples analyzed exhibited the following "G" values.

| | |
|---|---|
| Run 6 | G = 2.35 |
| Run 7 | G = 2.51 |
| Run 8 | G = 2.37 |
| Run 11 | G = 1.55 |
| Run 12 | G = 1.43 |
| Run 13 | G = 1.17 |
| Run 14 | G = 1.22 |
| ASTM TESTS USED | |
| CTAB, m²/gm | D 3765-80 |
| N₂SA, m²/gm | D 3037-80 |
| 24M4 DBP, cc/100 gm | D 3493-80 |
| Tint | D-3265-80 |
| Photelometer | D 1618-80 |
| TR (Tint Residual) (U.S. Pat. No. 4,267,160-1981) | |

TR = Tint − [56.0 + 1.057 (CTAB) − 0.002745 (CTAB)² − 0.2596 (24M4DBP) − 0.201 (N₂SA·CTAB)]

That which is claimed is:

1. A carbon black characterized by a CTAB surface area of between about 70 and about 110 m²/g, a 24M4DBP structure, of at least 92, a tint of less than about 99.8, and an aggregate size distribution breadth index G in the range of about 2.0 to about 2.6.

2. A carbon black as in claim 1 further characterized by a tint residual of less than about −12.

* * * * *